(12) United States Patent
Yadav et al.

(10) Patent No.: US 12,032,445 B2
(45) Date of Patent: Jul. 9, 2024

(54) SPECIALIZED DATA MANAGEMENT FOR PERFORMING INCREMENTAL BACKUPS TO A CLOUD-BASED OBJECT STORAGE

(71) Applicant: EMC IP Holding Company LLC, Hopkinton, MA (US)

(72) Inventors: Sunil Yadav, Bangalore (IN); Shelesh Chopra, Bangalore (IN); Ravi Vijayakumar Chitloor, Bengaluru (IN); Tushar Dethe, Bangalore (IN); Amarendra Behera, Bangalore (IN); Deependra Singh, Kanpur (IN); Jigar Bhanushali, Valsad (IN); Himanshu Arora, Bangalore (IN); Prabhat Kumar Dubey, Chikkanagamangala (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 141 days.

(21) Appl. No.: 17/126,582

(22) Filed: Dec. 18, 2020

(65) Prior Publication Data
US 2022/0197749 A1    Jun. 23, 2022

(51) Int. Cl.
*G06F 11/14* (2006.01)
*G06F 16/23* (2019.01)

(52) U.S. Cl.
CPC ...... *G06F 11/1446* (2013.01); *G06F 16/2379* (2019.01); *G06F 2201/80* (2013.01)

(58) Field of Classification Search
CPC ....... G06F 11/14; G06F 16/23; G06F 2201/80
See application file for complete search history.

(56) References Cited

U.S. PATENT DOCUMENTS

| | | | |
|---|---|---|---|
| 8,539,179 B1* | 9/2013 | Stringham | G06F 11/1448 |
| | | | 711/E12.103 |
| 9,235,606 B1* | 1/2016 | Mooney | G06F 16/21 |
| 9,430,332 B1* | 8/2016 | Bahadure | G06F 16/27 |
| 9,535,932 B1* | 1/2017 | DeSantis | G06F 16/21 |
| 10,754,731 B1* | 8/2020 | Arumugam | G06F 11/1461 |
| 2007/0185934 A1* | 8/2007 | Cannon | G06F 11/1448 |
| | | | 714/E11.122 |

(Continued)

*Primary Examiner* — Maher N Algibhah
(74) *Attorney, Agent, or Firm* — Dergosits & Noah LLP; Todd A. Noah

(57) ABSTRACT

Described is a system (and method) for specialized data management when performing incremental backups to a cloud-based object storage. When backing up client data, the server may utilize incremental backups to conserve the amount of storage space required on the object storage. However, the server may implement a configuration that enables full reconstruction of the client data at the time of recovery. To provide such capabilities, the server may leverage a specialized metadata database. The metadata database may be an embedded database maintained by the server. The server may leverage the metadata database to provide further storage efficiencies by storing certain incremental backup data exclusively within the metadata database. Accordingly, the server may implement a data management configuration as part of a backup service that conserves storage usage, and as a result, storage costs when using on a third-party cloud-based object storage.

20 Claims, 5 Drawing Sheets

(56) References Cited

U.S. PATENT DOCUMENTS

| | | | |
|---|---|---|---|
| 2013/0080397 A1* | 3/2013 | Payne | G06F 16/20 |
| | | | 707/681 |
| 2019/0213088 A1* | 7/2019 | Olson | G06F 12/12 |
| 2019/0311040 A1* | 10/2019 | Nayak | G06F 11/1469 |
| 2020/0409909 A1* | 12/2020 | Moldvai | G06F 16/137 |
| 2021/0117285 A1* | 4/2021 | Sengupta | G06F 11/1451 |

* cited by examiner

SPECIALIZED DATA MANAGEMENT FOR PERFORMING INCREMENTAL BACKUPS TO A CLOUD-BASED OBJECT STORAGE

TECHNICAL FIELD

This disclosure relates to cloud-based storage systems, and more particularly, managing backup data on a cloud-based object storage.

BACKGROUND

Cloud-based storage systems (or on-demand storage systems) may provide various tools that are crucial for enterprise level network clients. For example, clients may rely on such systems for data protection and recovery services that efficiently back up and recover data in the event of data loss to allow business applications to remain in service or quickly come back up to service. Clients may rely on such cloud-based storages to leverage the benefits associated with such on-demand systems such as cost efficiency and scalability. These cloud-based systems may implement an object-based storage architecture, and accordingly, client data such as backup data may be stored as objects (or data objects). To limit the amount of data transferred during a backup procedure, the client data may be stored to an object storage using incremental backups. For example, only the changes to the client data since the previous backup will be as part of the incremental backup. However, due to the limited APIs provided by object storages, in order to perform a full recovery to the incremental backup, the existing data of the previous backup and the data of the new incremental backup are combined and restored on the object storage. In other words, in response to the incremental backup, backup data already existing on the object storage is recopied within the object storage. For example, if an incremental backup includes 100 MB of data and the previous backup (e.g. full backup) already stored on the object storage includes 1 GB of data, the incremental backup results in storing 1.1 GB (1 GB+100 MB) of data in one or more new objects on the object storage. As a result, the total amount of data stored on the object storage includes 1 GB from the previous backup plus an additional 1.1 GB as a result of the incremental backup. Accordingly, the native capabilities of the object storage may result in an inefficient allocation of storage resources even when incremental backups are implemented. This results in increased storage costs incurred by clients of a third-party object storage. Thus, there is a continued need to efficiently manage storage usage when performing incremental backups to an object storage.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
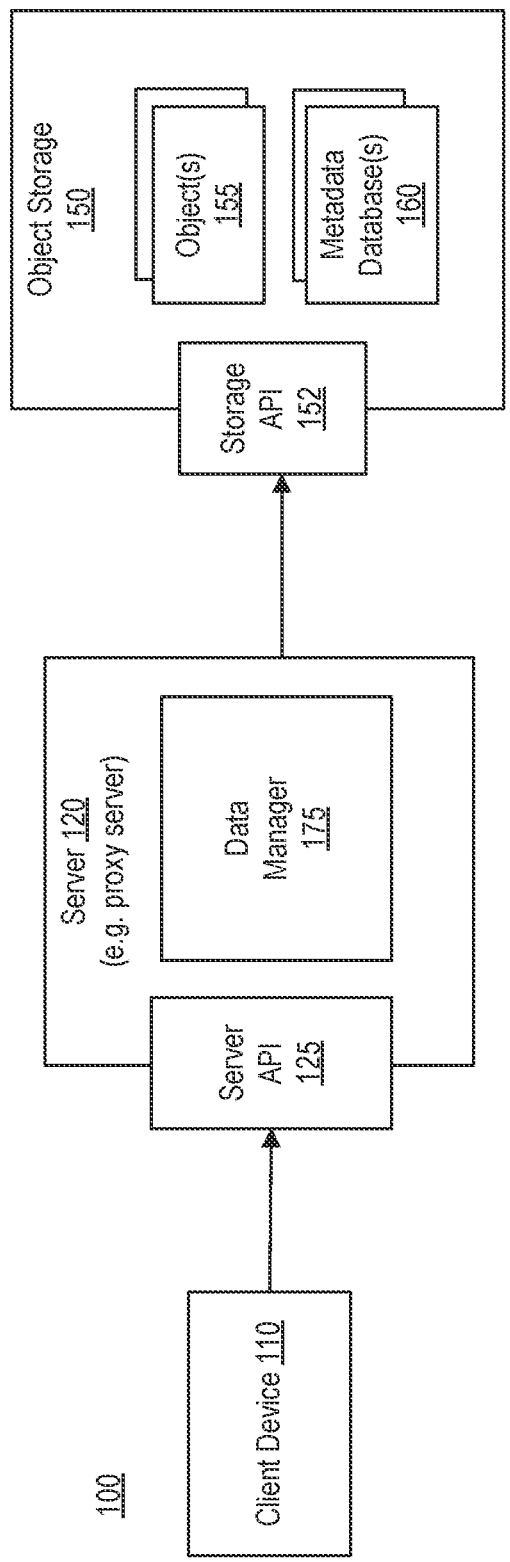
FIG. 1 is a block diagram illustrating an example of an operating environment that may be used in conjunction with one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

Described is a system (and method) for specialized data management when performing incremental backups to a cloud-based object storage. The system may be implemented as part of a server (or gateway) that provides a backup service and may act as an intermediary between a client device and third-party cloud-based object storage. When backing up client data, the server may utilize incremental backups to conserve the amount of storage space required on the object storage. However, the server may implement a configuration that enables full reconstruction of the client data at the time of recovery. For instance, continuing with the previous example, if an incremental backup includes 100 MB of data and the previous backup (e.g. full backup) already stored on the object storage includes 1 GB of data in an existing set of objects, the incremental backup results in storing only the 100 MB of data to a new set of objects, and the 1 GB of data being retained in the already existing set of objects. The server may then perform a specialized process to perform a reconstruction of the 1.1 GB at the time of recovery. To provide such capabilities, the server may leverage a specialized metadata database. The metadata database may be an embedded database maintained by the server. For example, the metadata database may be created by the server using a particular software library (e.g. SQLite library). In addition, the server may leverage the metadata database to provide further storage efficiencies by storing certain incremental backup data exclusively within the metadata database. This results in a further conservation of storage resources as new data objects are not required to store such data. Moreover, the server may delete unused objects to free up storage resources. Accordingly, the server may implement a data management configuration as part of a backup service that conserves storage usage, and as a result, storage costs when using on a third-party cloud-based object storage.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include storage systems provided by a cloud service provider.

More specifically, and with reference to FIG. 1, shown is a block diagram illustrating an example of an operating environment 100 for managing backup data on an object storage according to one or more embodiments of the disclosure. It should be noted that the components of operating environment 100 may interact via a network, which may be any type of wired or wireless network including a local area network (LAN), a wide area network (WAN), or a direct communication link, or other suitable connection.

As shown, the environment 100 may include a client device 110, a server (e.g. a cloud-based component/gateway and/or a proxy server) 120, and a cloud-based (or on-demand) object storage 150. In general, the server 120 may act as an intermediary between the client device 110 and the object storage 150. In some embodiments, the client device 110 may be associated with a client that is a customer (or subscriber, client, tenant, user, account, etc.) of a backup service or platform (e.g. software/platform-as-a-service) provided by a first entity, as well as a customer of an object storage or service (e.g. software/platform-as-a-service) provided by a different (or second) entity. For example, the server 120 may be provided as part of the backup service provided the first entity (e.g. Dell EMC), and the object storage 150 may be provided as part of an object storage service provided by the different entity (e.g. Amazon S3, Microsoft Azure, IBM Cloud Object Storage, Google Cloud Storage, etc.). In some embodiments, the first entity providing the backup service may also provide (or host) the client device 110 (e.g. as part of a VM).

The client device (or client system) 110 may be associated with client data (or data) that is backed up to the object storage 150. The object storage (or object storage system) 150 may include a persistent object storage that implements a storage architecture that manages data as an object(s) 155. For example, each object 155 stored by the object storage 150 may include data, meta-data, and/or a globally unique identifier for the object. The client device 110 may use the server 120 as an intermediary for managing client backup data stored on the object storage 150. For example, the server 120 may provide enhanced security by being a single secure point of access to data stored externally on the object storage 150. For example, a client device 110 may implement certain a network configuration (e.g. firewall) that limits external access to the client environment. Such a network configuration may be customized to authorize external access to the client device 110 only by the server 120 and not the object storage 150 directly. In addition, the server 120 may also allow the client device 110 to offload resource intensive data management processing. For example, the server 120 may handle backup-related data processing before storing data into the object storage 150. Accordingly, the server 120 may provide advantages over traditional proxy servers that merely forward data to the object storage 150. In addition, the server 120 may be an application or hardware component remote from the client device 110 (e.g. as part of a cloud-based service). Accordingly, the server 120 may be scalable such that it may perform data operations in parallel for multiple client devices 110 and for multiple object storages 150.

As described, the server 120 may act as an intermediary for communications between the client device 110 and an object storage 150. For example, these communications may include requests by the client device 110 to perform data operations on the object storage 150, which are routed though the server 120. For example, the client device 110 may provide (or send, transmit, etc.) client data (or data) to the server 120 using a server API 125. The server 120 may then initiate (or perform, execute, etc.) a corresponding storage operation directly on the object storage using the storage API 152. In some embodiments, the server API 125 may be a REST API that includes a common set of operations that correspond to various data-related operations on the object storage 150. For example, the server API 125 may include operations allowing a client device 110 to store and recover client data backed up to the object storage 150. For example, the server API 125 may allow the client device 110 to read data from an object storage 150, write data to an object storage 150, copy data within the object storage 150, and various other operations for managing data. The same set of operations provided by the server API 125 may be used by the client device 110 irrespective of the type of object storage 150. To provide such object-storage-agnostic functionality, the server 120 may include a function library that includes object-storage-specific functions. Accordingly, the server 120 may use such object-storage-specific functions to interact directly with the object storage 150. For example, the server 120 may initiate data operations directly on the object storage 150 by calling various methods (functions, operations, etc.) of the storage API 152. In some embodiments, the storage API 152 may include only a standard set of storage operations. Accordingly, the server 120 may implement efficient storage and recovery procedures as further described herein.

As described, the server 120 may manage backed up client data stored on the object storage 150. Accordingly, the server 120 may include a data manager 175. The data manager (or manager) 175 may coordinate (or manage, orchestrate, execute, automate, etc.) the initiation (or execution) of storage and recovery operations on the object storage 150. In some embodiments, the data manager 175 may provide a user interface that allows a user to perform and configure various settings associated with managing backup data. For example, the user interface may allow a user to configure (e.g. input) various settings such as a backup schedule including the frequency of full and incremental backups to the object storage 150. In addition, the data manager 175 may direct (or control, initiate, etc.) other components of the operating environment 100 to perform various processes as further described herein.

To further improve potential storage and recovery efficiency, the server 120 may leverage a specialized metadata database 160. The metadata database 160 may be maintained by the server 120. The metadata database 160 may include an embedded database. For example, the metadata database 160 may be created by the server 120 using a particular software library (e.g. SQLite library). The metadata database 160 may reside on the object storage 150, the server 120, and/or another component (e.g. cloud-based component) that is accessible by the server 120. For example, the server 120 may update the metadata database 160 when residing on the object storage 150 by accessing the storage API 152.

The metadata database 160 may store metadata associated with client data stored on the client device 110 and/or backed up to the object storage 150. The metadata may include information that is stored as part of the client data. For example, the client data may include data files (or files) that store metadata as part of the file. Accordingly, a copy of such metadata may also be stored as part of the metadata database 160. In some embodiments, the metadata of the metadata database 160 may be stored as properties (or values) associated with the client data (or file). For example, these properties may include information related to a time (e.g. last accessed time, last modified time, creation time, etc.), author, importance, read only, storage location, etc. In some embodiments, the client data may include emails. Accordingly, properties that are stored as part of the metadata for an email may include a value indicating whether the email is read/unread, whether the email is flagged by a user, marked as important or urgent, a priority level, whether the email includes an attachment, last sent date, a due date associated with the email, etc. The metadata database 160 may also store various types of backup information associated with the backed up client data. For example, the backup information may include a point-in-time the client data was backed up, a storage location of the backed up client data, an object ID to which the backed up client data is stored, and various other types of information. Accordingly, the metadata database 160, and more particularly, the metadata stored therein, may be leveraged by the server 120 when storing and recovering data in an efficient manner as further described herein.

Figure 2:
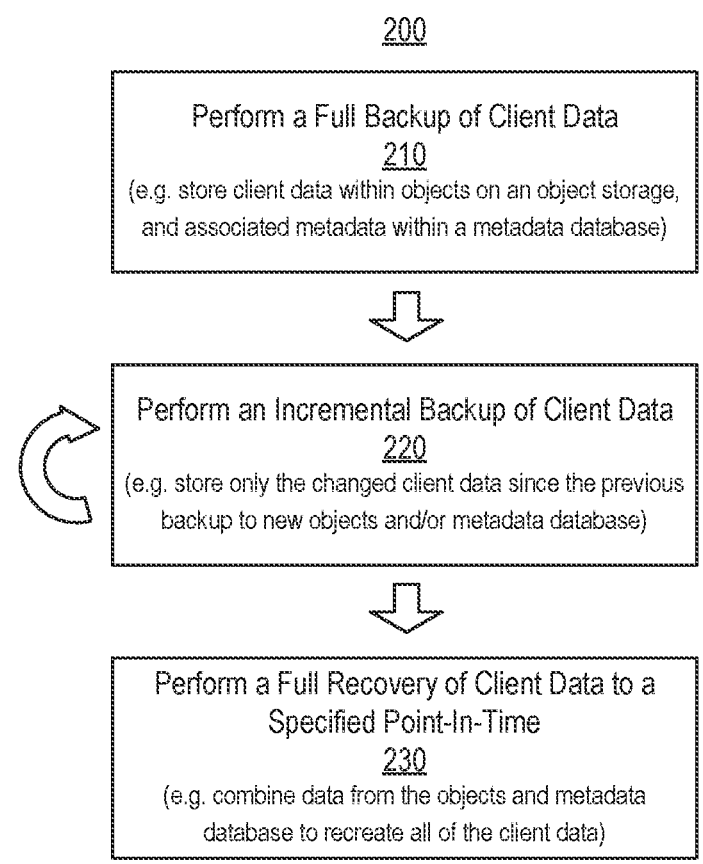
FIG. 2 is a process flow diagram illustrating an overview of a process for managing backup data on an object storage according to one or more embodiments of the disclosure.

FIG. 2 is a process flow diagram illustrating an overview of a process for managing backup data on an object storage according to one or more embodiments of the disclosure.

In 210, the server (e.g. server 120) may perform a full backup of the client data (e.g. at a first point-in-time). For example, the system may determine that the client data has not been previously backed up, and accordingly, may initiate the full backup. The server 120 may perform backups of client data in response to receiving a request to perform a backup of the client data. For example, the request may be from a user (e.g. backup administrator) or from a backup application (e.g. as part of a scheduled backup procedure). As part of the backup, the server may store a backup of the client data on the object storage (e.g. object storage 150) as one or more objects (e.g. objects 155), and the server may also store metadata associated with the client data within a metadata database (e.g. metadata database 160). Accordingly, the server may store data in a specialized manner as further described with reference to FIG. 3.

Figure 3:
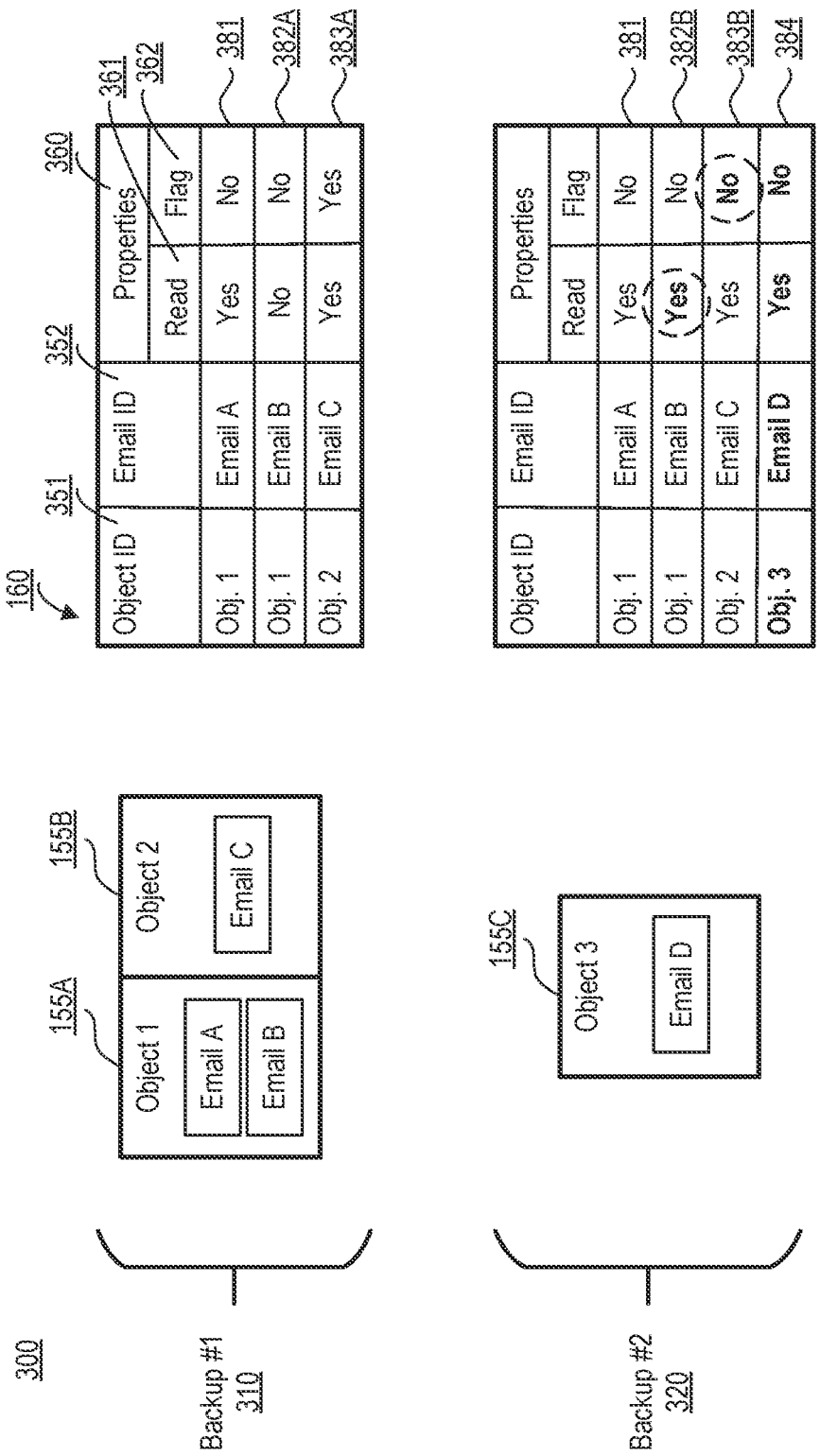
FIG. 3 is a diagram illustrating a data management configuration including storing data within one or more objects and a metadata database according to one or more embodiments of the disclosure.

FIG. 3 is a diagram illustrating a data management configuration including storing data within one or more objects 155 and a metadata database 160 according to one or more embodiments of the disclosure. As shown, as part of backup #1 310 (e.g. full backup), the server may store the client data within two newly created objects (objects 1 155A and 2 155B). In this example, the client data includes emails, and as shown, object 1 155A stores emails A and B, and object 2 155B stores email C. In some embodiments, an object may be configured to store a certain amount of data that is specialized for the type of data to be backed up. For example, each object may be configured to store an amount of data that is specialized for client emails. For instance, in this example, each object may be configured to store 4 MB of data, and accordingly, object 1 155A may store emails A and B, which are approximately 2 MB each, and object 2 155B may store email C, which is approximately 4 MB.

Additionally, the server may store metadata associated with the backed up client data within the metadata database 160. As shown in this example, the metadata database 160 may be in the form of a table and may store an entry for each email backed up. The metadata database 160 may store various types of information such as an object ID 351, an email ID 352, and metadata such as one or more properties 360 that may be associated with an email. A property 360 may be described by one or more attributes (or values). In this example, the properties 360 may include a read attribute 361, and a flag attribute 362. The read attribute 361 (e.g. read/unread value) may indicate whether a particular email has been read by a user, and the flag attribute 362 (e.g. flag value) may indicate whether a particular email had been flagged by a user.

In this example, the server stores entries 381, 382A, and 383A that correspond to emails A, B, and C respectively, and each entry may be associated with backup #1 310 and/or a point-in-time of backup #1 310 (e.g. a first point-in-time). As shown, each of the entries 381, 382A, and 383A identifies the object (e.g. via object ID 351) in which the corresponding email (e.g. identified by email ID 352) is stored along with one or more associated properties 360. For example, entry 381 indicates that email A is stored in object 1, the read attribute 361 of email A indicates the email has been read, and the flag attribute 362 of email A indicates the email has not been flagged by a user. Entry 382A indicates that email B is stored in object 1, the read attribute 361 of email B indicates the email has not been read, and the flag attribute 362 of email B indicates the email has not been flagged by a user. Entry 383A indicates that email C is stored in object 2, the read attribute 361 of email C indicates the email has been read, and the flag attribute 362 of email C indicates the email has in fact been flagged by a user.

It should be noted that these email properties 360 are used as examples and that various other properties (or metadata) associated with an email (or other type of client data) may be stored within the metadata database 160. Accordingly, such other properties (or metadata) may be stored as part of the metadata database 160 and used for efficient recovery in a similar manner as the example properties described herein.

The metadata database 160 may also include additional types of metadata (not shown). For example, the metadata database 160 may include metadata associated with a particular backup such as point-in-time information indicating when the backup was performed. For example, entries 381, 382A, and 383A may be associated with a point-in-time corresponding to backup #1 310. As another example, objects 1 155A and 2 155B may be associated with a point-in-time corresponding to backup #1 310. This information may be stored as part of the metadata database 160, or may be stored in a separate database by the server. Accordingly, the server may determine which objects are associated with a particular backup and/or a point-in-time, for example, when performing client data recovery.

Returning to FIG. 2, after performing at least one full backup, in 220, the server may perform an incremental backup (e.g. at a second point-in-time). To perform the incremental backup (also referred to as a differential incremental backup), the server may determine the changes (or delta) of client data between the point-in-time of the previous backup (e.g. full or incremental backup) and the point-in-time of the current backup. As shown, the server may repeatedly perform incremental backups as necessary (e.g. periodically based on a schedule). For example, the next backup (e.g. a third point-in-time) may also be an incremental backup, and accordingly, would store only the changes since the previous incremental backup (e.g. at the second point-in-time). In some embodiments, the multiple incremental backups may include full backups dispersed therebetween.

As part of the incremental backup, the server may store the new data within one or more new objects on the object storage. In addition, as part of the incremental backup, the server may store metadata associated with the new data within the metadata database. The server may also store certain changes to the client data exclusively within the metadata database.

Referring again to FIG. 3, as part of the incremental backup (e.g. backup #2 320), the server may determine that since the first backup (e.g. backup #1 310), the client data includes a new email (e.g. email D). Accordingly, the new email may be stored as part of a new object (object 3 155C). As shown, object 3 155C only stores email D, and the previously backed up emails (e.g. emails A-C) are retained in objects 1 155A and 2 155B. In other words, the data of objects 1 155A and 2 155B are not copied to additional objects (e.g. object 3 155C) as part of backup #2 320. Instead, when a full recovery is required, the server may combine the data of objects 1-3 155A-C to create a complete dataset (e.g. emails A-D).

In response to storing email D in object 3 155C, the server may store (e.g. add) entry 384 within the metadata database 160. Entry 384 may be associated with backup #2 320 and/or a point-in-time of backup #2 320 (e.g. a second point-in-time). As shown, entry 384 indicates that email D is stored in object 3, the read attribute 361 of email D indicates the email has been read, and the flag attribute 362 of email D indicates the email has not been flagged by a user.

In addition, the server may perform a specialized backup of client data by storing certain changes exclusively within the metadata database 160. In other words, certain changes to client data may be stored only within the metadata database 160 and not within an object 155. For example, when the properties (or metadata) of client data have changed since the last backup, the server may store only the changes within the metadata database for further storage conservation. For example, the server may determine that since backup #1 310, properties associated with client emails B and C on the client device have since changed. In particular, email B may have been read, and email C may have been unflagged. Accordingly, as part of backup #2 320, the server may update only the previous entries (e.g. entries 382A, and 383A) associated with emails A and C without storing such information within a new object. For example, with respect to email B, the server may store entry 382B to indicate that email B is still stored in object 1, update the read attribute 361 of email B to now indicate that the email has been read, and retain the flag attribute 362 of email B to indicate the email is still not flagged by a user. With respect to email C, the server may store entry 383B to indicate that email C is still stored in object 2, retain the read attribute 361 of email B to indicate the email has been read, and update the flag attribute 362 of email C to now indicate the email has been unflagged by a user.

As described, certain changes to client data may be backed up exclusively to the metadata database 160 without storing the changes within new objects, or updating any existing objects. The server may perform a specialized recovery procedure to incorporate the changes to the client data preserved within the metadata database 160.

It should be noted that is this example, during backup #2 320, the server may copy or create a new instance of the metadata database 160 from the previous backup (e.g. backup #1 310) and update the necessary entries as necessary. Accordingly, each backup (e.g. full or incremental) may be associated with a particular version or instance of the metadata database 160. Alternatively, during each backup (e.g. full or incremental), the server may add entries to the metadata database 160 (e.g. cumulatively), and accordingly, may identify the applicable entries during a recovery procedure. For example, the server may determine certain entries for an email are to be overwritten by a subsequent entry for the email. In other words, the server may determine that certain entries override previous entries depending on the recovery point-in-time.

In addition, the server may delete certain objects when the data is no longer required such as after the objects have expired. For example, after the data associated with the backup #1 310 expires, the server may delete objects 1 155A and 2 155B to free up storage space within the object storage. As another example (not shown), the server may determine that a particular email (e.g. email C) has been deleted since backup #1 310. In such a scenario, the server may record the deletion of email C within the metadata database 160, and as a result, the server may potentially skip the reconstruction of object 2 155B during a recovery procedure.

Returning once again to FIG. 2, in 230, the server may perform a full recovery (or restore) of client data. The server may perform the full recovery in response to receiving a request to recover client data to a particular point-in-time (or recovery point-in-time). The full recovery may include the server recovering (or recreating, restoring, reconstructing, etc.) all of the client data which existed at the particular point-in-time.

For example, referring once again to FIG. 3, the server may receive a request to perform a full recovery of client data to the point-in-time of backup #2 320. Accordingly, the server may determine that performing a full recovery to such a point-in-time requires obtaining data from the last full backup (e.g. backup #1 310), any intervening backups, and backup #2 320. Accordingly, in this in this scenario, the server may determine the data required to perform the recovery requires the data backed up during backup #1 310, and backup #2 320. More specifically, the server may determine that the data required includes the objects stored during those backups, which in this example, includes objects 1 155A and 2 155B (e.g. any objects stored as part of backup #1 310), and object 3 155C (e.g. any objects stored as part of backup #2 320). In addition, the server may determine the relevant backups and/or objects are associated with certain entries within the metadata database 160. For example, the server may determine entries 381, 382B, 383B, and 384 are associated with performing the recovery to the point-in-time associated with backup #2 320.

Accordingly, to create the full dataset required for a full recovery, the server may reconstruct (or combine) the data from objects 1 155A and 2 155B (e.g. emails A-C), and the data from object 3 155C (e.g. email D). In addition, the server may merge the certain metadata entries with the reconstructed (or combined) data. In this example, the server may merge entries 382B and 383B with the reconstructed data. Accordingly, the properties 360 associated with the reconstructed data for emails B and C may be updated to indicate that the email B is read, and email C is unflagged. As a result, the server has accurately reconstructed the client data to the specified point-in-time by leveraging the specialized metadata database 160.

It should be noted that the configuration of the metadata database 160 in this example copies the entries from the previous backups, and therefore, the metadata database 160 associated with backup #2 320 includes all of the necessary information. Alternatively, the metadata database 160 may store entries in a cumulative manner, and in such configurations, the server may perform a determination to identify all of the relevant entries during reconstruction.

Figure 4:
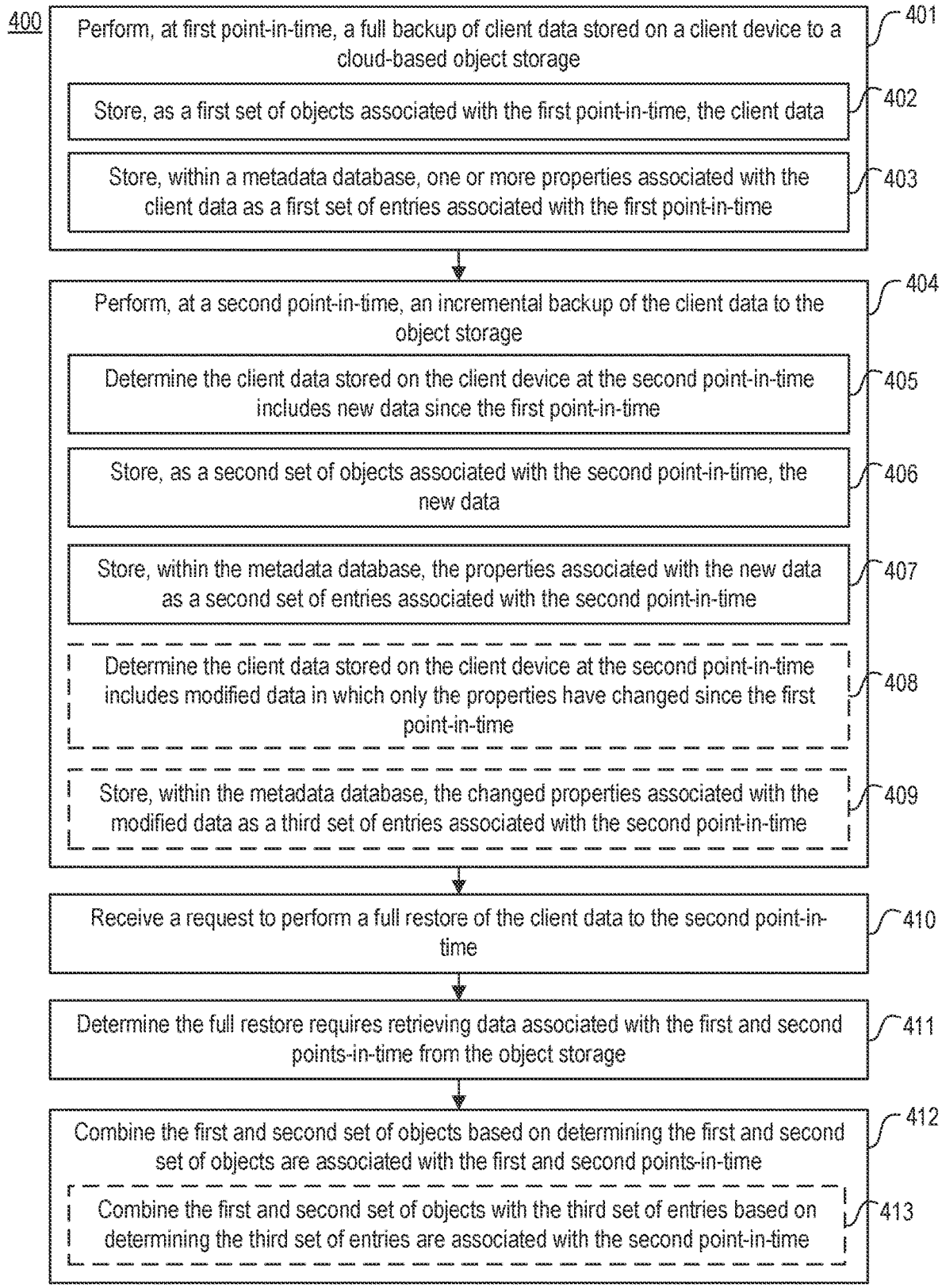
FIG. 4 is a flow diagram illustrating a method of managing backup data on an object storage according to one or more embodiments of the disclosure.

FIG. 4 is a flow diagram illustrating an example method of managing backup data on an object storage according to one or more embodiments of the disclosure. Process 400 may use processing logic, which may include software, hardware, or a combination thereof. For example, process 400 may be performed by a system including one or more components described in operating environment 100 (e.g. server 120, etc.). In some embodiments, the system may include a server (e.g. server 120) that acts as an intermediary between the client device (e.g. client device 110) and a cloud-based object storage (e.g. object storage 150).

In 401, the system (e.g. server 120) may perform a full backup of client data stored on a client device to a cloud-based object storage. The full backup (e.g. backup #1 310) may be performed at first point-in-time. In some embodiments, the client data stored on the client device includes data files, and the properties (e.g. metadata) associated with the client files includes metadata stored as part of the data files. The client data may also include client emails, and the properties (e.g. metadata) associated with the client emails may include email properties.

In 402, the system may store the client data (e.g. a backup of the client data) as a first set of objects (e.g. objects 155A-155B) on the object storage. The first set of objects may be associated with the first point-in-time. In some embodiments, performing the full backup may include accessing, by a server acting as an intermediary between the client device and the object storage, a storage application programming interface (API) of the object storage. For example, the server may access a storage function of the storage API to store client data as the first set of objects.

In 403, the system may store one or more properties associated with the client data within a metadata database. The properties associated with the client data may be stored as a first set of entries (e.g. entries 381, 382A, and 382A) associated with the first point-in-time.

The metadata database (e.g. metadata database 160) may be maintained separately from the first set of objects. For example, the metadata database may be a distinct datastore from the objects that store the backed up client data. In some embodiments, the metadata database may also be stored within the object storage. For example, the server may access the object storage when managing (e.g. reading, writing, updating, etc.) entries within the metadata database. In some embodiments, the metadata database may be an embedded database. For example, the metadata database may be created by the server on the object storage using a particular software library (e.g. SQLite library).

In 404, the system may perform an incremental backup of the client data to the object storage. The incremental backup (e.g. backup #2 320) may be performed at a second point-in-time.

In 405, the system may determine the client data stored on the client device at the second point-in-time includes new data since the first point-in-time.

In 406, the system may store the new data (e.g. a backup of the new client data) within a second set of objects (e.g. object 155C) on the object storage. The second set of objects may be associated with the second point-in-time. The second set of objects may store only the new data. For example, the second set of objects (e.g. object 155C) may store only the new data (e.g. email D) and not data (e.g. emails A-C) already stored in existing objects (e.g. objects 155A-155B).

In some embodiments, performing the incremental backup may include accessing, by a server acting as an intermediary between the client device and the object storage, a storage application programming interface (API) of the object storage. For example, the server may access a storage function of the storage API to store client data as the second set of objects.

In 407, the system may store the properties associated with the new data within the metadata database. The properties associated with the new data may be stored as a second set of entries (e.g. entry 384) associated with the second point-in-time.

In some embodiments, storing the properties associated with the new data with the metadata database may include creating a new instance of the metadata database, copying the first set of entries (e.g. entries 381, 382A, 383A) to the new instance, and storing, within the new instance, the properties associated with the new data as the second set of entries (e.g. entry 384) associated with the second point-in-time.

As part of the incremental backup, the server may also store the changed properties (e.g. metadata) of the client data exclusively within the metadata database. For example, despite properties being stored as part of the client data and backed up to one or more objects, the server need not update the data within the objects, and instead, may preserve (or track, record, etc.) the changed properties by storing them within the metadata database. The changed properties may then be merged (or combined) with the data stored in the objects at the time of recovery.

For example, in 408, the system may determine the client data stored on the client device at the second point-in-time further includes modified data in which only the properties (e.g. metadata) have changed since the first point-in-time.

Accordingly, in 409, the system may store the changed properties associated with the modified data within the metadata database. The changed properties associated with the modified data may be stored as a third set of entries (e.g. entries 382B and 383B) associated with the second point-in-time.

As part of efficiently managing data on the object storage, the server may also delete expired objects from the object storage. For example, the server may determine data associated with the first point-in-time have expired (e.g. point-in-time associated with backup #1 310), and delete the first set of objects (e.g. objects 1 155A and 2 155B) in response to determining the first set of objects are associated with the first point-in-time.

In 410, the system may receive a request to perform a full restore (or recovery) of the client data to the second point-in-time. For example, the server may receive a request from a user associated with the client device to restore the client data to the second point-in-time (e.g. point-in-time associated with backup #2 320).

In 411, the system may determine the full restore (or reconstruction, recovery, etc.) of the client data to the second point-in-time requires retrieving data associated with the first and second points-in-time from the object storage. For example, the system may determine restoring the client data to the second point-in-time (e.g. backup #2 320), requires retrieving data associated with the previous full backup (e.g. backup #1 310) and any incremental backups up to, and including, the second point-in-time.

In 412, the system may combine, as part of performing the full restore (or recovery), the first and second set of objects based on determining the first and second set of objects are associated with the first and second points-in-time. For example, the server may combine the data from the first and second objects (e.g. emails A, B, and C with email D) to create a complete dataset for performing the full restore of the client data to the second point-in-time.

When the server stores changed properties as part of the metadata database (e.g. in operation 409), the system may also incorporate these properties into the data for the full restore.

For example, in 413, the system may further combine the first and second set of objects with the third set of entries based on determining the third set of entries are associated with the second point-in-time. For example, the server may combine (or merge, reconcile, etc.) the data from the first and second objects (e.g. emails A, B, C, and D) with the data from the third set of entries (e.g. entries 382B and 382B) to create a complete dataset for performing the full restore of the client data to the second point-in-time. Accordingly, in some embodiments, combining the first and second set of objects with the third set of entries may include overwriting the properties of the client data stored as part of the first set of objects with the changed properties stored as part of the third set of entries.

In some embodiments, as part of the restore process, the server may store the combined data from the first and second set of objects within one or more newly created objects on the object storage, and transfer the data from the newly created objects to the client device. In addition, or as an alternative, the server may retrieve the combined data from the first and second set of objects, and transfer the data directly to the client device.

Figure 5:
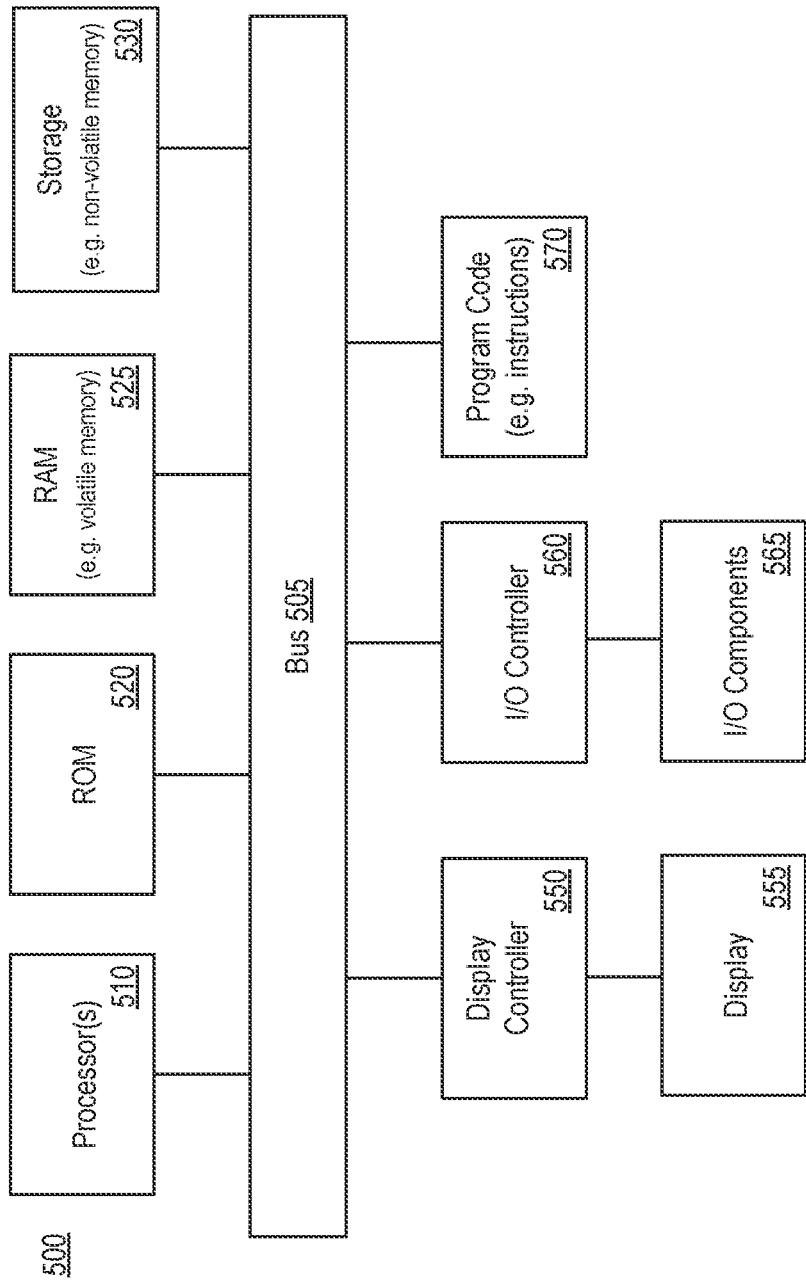
FIG. 5 is a block diagram illustrating an example of a computing system that may be used in conjunction with one or more embodiments of the disclosure.

FIG. 5 shows a block diagram of an example of a computing system that may be used in conjunction with one or more embodiments of the disclosure. For example, computing system 500 (or system, or server, or computing device, or device) may represent any of the devices or systems (e.g. server 120, client device 110, object storage 150, etc.) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 505 which may be coupled to a processor 510, ROM (Read Only Memory) 520, RAM (or volatile memory) 525, and storage (or non-volatile memory) 530. The processor(s) 510 may retrieve stored instructions from one or more of the memories 520, 525, and 530 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 510 may perform operations in an on-demand or "cloud computing" environment or as a service (e.g. within a "software as a service" (SaaS) implementation). Accordingly, the performance of operations may be distributed among the one or more processors 510, whether residing only within a single machine or deployed across a number of machines. For example, the one or more processors 510 may be located in a single geographic location (e.g. within a home environment, an office environment, or a server farm), or may be distributed across a number of geographic locations. The RAM 525 may be implemented as, for example, dynamic RAM (DRAM), or other types of memory that require power continually in order to refresh or maintain the data in the memory. Storage 530 may include, for example, magnetic, semiconductor, tape, optical, removable, non-removable, and other types of storage that maintain data even after power is removed from the system. It should be appreciated that storage 530 may be remote from the system (e.g. accessible via a network).

A display controller 550 may be coupled to the bus 505 in order to receive display data to be displayed on a display device 555, which can display any one of the user interface features or embodiments described herein and may be a local or a remote display device. The computing system 500 may also include one or more input/output (I/O) components 565 including mice, keyboards, touch screen, network interfaces, printers, speakers, and other devices. Typically, the input/output components 565 are coupled to the system through an input/output controller 560.

Program code 570 may represent any of the instructions, applications, software, libraries, toolkits, modules, components, engines, units, functions, logic, etc. as described herein (e.g. server 120, data manager 175, etc.). Program code 570 may reside, completely or at least partially, within the memories described herein (e.g. non-transitory computer-readable media), or within a processor during execution thereof by the computing system. Program code 570 may include both machine code, such as produced by a compiler, and files containing higher-level or intermediate code that may be executed by a computing system or other data processing apparatus (or machine) using an interpreter. In addition, program code 570 can be implemented as software, firmware, or functional circuitry within the computing system, or as combinations thereof. Program code 570 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer-readable medium storing a plurality of instructions, which when executed, cause the one or more processors to:
perform, at a first point-in-time, a full backup of client data stored on a client device to a cloud-based object storage, the full backup including:
storing, as a first set of objects associated with the first point-in-time, the client data; and
storing, within a metadata database, one or more properties associated with the client data as a first set of entries associated with the first point-in-time;
perform, at a second point-in-time, an incremental backup of the client data to the object storage, the incremental backup including:
determining the client data stored on the client device at the second point-in-time includes new data since the first point-in-time;
storing, as a second set of objects associated with the second point-in-time, the new data, the second set of objects storing only the new data; and
storing, within the metadata database, properties associated with the new data as a second set of entries associated with the second point-in-time;
receive a request to perform a full restore of the client data to the second point-in-time;
determine the full restore requires retrieving data associated with the first and second points-in-time from the object storage in response to receiving the request to perform the full restore of the client data to the second point-in-time; and
combine, as part of performing the requested full restore, the first and second set of objects, based on determining the first and second set of objects are associated with the first and second points-in-time, with properties of the client data that were modified since the first point-in-time and stored in the metadata database.

2. The system of claim 1, wherein the incremental backup further includes:
determining the client data stored on the client device at the second point-in-time further includes the modified data in which only the properties have changed since the first point-in-time; and
storing, within the metadata database, the changed properties associated with the modified data as a third set of entries associated with the second point-in-time, and
wherein the combining further includes combining the first and second set of objects with the third set of entries based on determining the third set of entries are associated with the second point-in-time.

3. The system of claim 2, wherein combining the first and second set of objects with the third set of entries includes overwriting the properties of the client data stored as part of the first set of objects with the changed properties stored as part of the third set of entries.

4. The system of claim 1, wherein the client data stored on the client device includes data files, and the properties associated with the client files includes metadata stored as part of the data files.

5. The system of claim 1, wherein the client data includes client emails, and the properties associated with the client emails includes email properties.

6. The system of claim 1, wherein storing, within the metadata database, the properties associated with the new data includes:
creating a new instance of the metadata database;
copying the first set of entries to the new instance; and
storing, within the new instance, the properties associated with the new data as the second set of entries associated with the second point-in-time.

7. The system of claim 1, wherein the plurality of instructions, when executed, further cause the one or more processors to:
determine data associated with the first point-in-time has expired; and
delete the first set of objects in response to determining the first set of objects are associated with the first point-in-time.

8. The system of claim 1, wherein performing the full backup and the incremental backup includes accessing, by a server acting as an intermediary between the client device and the object storage, a storage application programming interface (API) of the object storage.

9. A method comprising:
performing, at a first point-in-time, a full backup of client data stored on a client device to a cloud-based object storage, the full backup including:
storing, as a first set of objects associated with the first point-in-time, the client data; and
storing, within a metadata database, one or more properties associated with the client data as a first set of entries associated with the first point-in-time;
performing, at a second point-in-time, an incremental backup of the client data to the object storage, the incremental backup including:
determining the client data stored on the client device at the second point-in-time includes new data since the first point-in-time;
storing, as a second set of objects associated with the second point-in-time, the new data, the second set of objects storing only the new data; and
storing, within the metadata database, the properties associated with the new data as a second set of entries associated with the second point-in-time;
receiving a request to perform a full restore of the client data to the second point-in-time;
determining the full restore requires retrieving data associated with the first and second points-in-time from the object storage in response to receiving the request to perform the full restore of the client data to the second point-in-time; and
combining, as part of performing the requested full restore, the first and second set of objects based on determining the first and second set of objects are associated with the first and second points-in-time, with properties of the client data that were modified since the first point-in-time and stored in the metadata database.

10. The method of claim 9, wherein the incremental backup further includes:
determining the client data stored on the client device at the second point-in-time further includes the modified data in which only the properties have changed since the first point-in-time; and
storing, within the metadata database, the changed properties associated with the modified data as a third set of entries associated with the second point-in-time, and wherein the combining further includes combining the first and second set of objects with the third set of entries based on determining the third set of entries are associated with the second point-in-time.

11. The method of claim 10, wherein combining the first and second set of objects with the third set of entries includes overwriting the properties of the client data stored as part of the first set of objects with the changed properties stored as part of the third set of entries.

12. The method of claim 9, wherein the client data stored on the client device includes data files, and the properties associated with the client files includes metadata stored as part of the data files.

13. The method of claim 9, wherein the client data includes client emails, and the properties associated with the client emails includes email properties.

14. The method of claim 9, wherein storing, within the metadata database, the properties associated with the new data includes:
creating a new instance of the metadata database;
copying the first set of entries to the new instance; and
storing, within the new instance, the properties associated with the new data as the second set of entries associated with the second point-in-time.

15. A computer program product comprising a non-transitory computer-readable medium having a computer-readable program code embodied therein to be executed by one or more processors, the program code including instructions to:
perform, at a first point-in-time, a full backup of client data stored on a client device to a cloud-based object storage, the full backup including:
storing, as a first set of objects associated with the first point-in-time, the client data; and
storing, within a metadata database, one or more properties associated with the client data as a first set of entries associated with the first point-in-time;
perform, at a second point-in-time, an incremental backup of the client data to the object storage, the incremental backup including:
determining the client data stored on the client device at the second point-in-time includes new data since the first point-in-time;
storing, as a second set of objects associated with the second point-in-time, the new data, the second set of objects storing only the new data; and
storing, within the metadata database, the properties associated with the new data as a second set of entries associated with the second point-in-time;
receive a request to perform a full restore of the client data to the second point-in-time;
determine the full restore requires retrieving data associated with the first and second points-in-time from the object storage in response to receiving the request to perform the full restore of the client data to the second point-in-time; and
combine, as part of performing the requested full restore, the first and second set of objects based on determining the first and second set of objects are associated with the first and second points-in-time, with properties of the client data that were modified since the first point-in-time and stored in the metadata database.

16. The computer program product of claim 15, wherein the incremental backup further includes:
determining the client data stored on the client device at the second point-in-time further includes the modified data in which only the properties have changed since the first point-in-time; and storing, within the metadata database, the changed properties associated with the modified data as a third set of entries associated with the second point-in-time, and wherein the combining further includes combining the first and second set of objects with the third set of entries based on determining the third set of entries are associated with the second point-in-time.

17. The computer program product of claim 16, wherein combining the first and second set of objects with the third set of entries includes overwriting the properties of the client data stored as part of the first set of objects with the changed properties stored as part of the third set of entries.

18. The computer program product of claim 15, wherein the client data stored on the client device includes data files, and the properties associated with the client files includes metadata stored as part of the data files.

19. The computer program product of claim 15, wherein the client data includes client emails, and the properties associated with the client emails includes email properties.

20. The computer program product of claim 15, wherein storing, within the metadata database, the properties associated with the new data includes:
   creating a new instance of the metadata database;
   copying the first set of entries to the new instance; and
   storing, within the new instance, the properties associated with the new data as the second set of entries associated with the second point-in-time.

* * * * *